United States Patent Office 3,316,312
Patented Apr. 25, 1967

3,316,312
PERFLUORINATED DIALKYL CYCLOBUTANES
Donald Irwin McCane, Claymont, and Ivan Maxwell Robinson, Wilmington, Del., assignors to E. I. du Pont de Nemours and Company, Wilmington, Del., a corporation of Delaware
No Drawing. Filed Apr. 10, 1959, Ser. No. 805,370
6 Claims. (Cl. 260—648)

This application is a continuation-in-part of copending application Ser. No. 572,638, filed Mar. 20, 1956, now abandoned.

This invention relates to novel perfluorinated compounds, and, more particularly, to novel perfluorinated compounds obtained through ring formation.

This invention has as an object the production of completely fluorinated compounds containing four carbon atom ring structures.

The words "perfluorocarbon" and "perfluorinated olefin or hydrocarbon" used in the description of the present invention define compounds which consist entirely of carbon and fluorine atoms.

The objects of the present invention are accomplished by a process which comprises heating a perfluorinated olefin having the formula $CF_2=CF—R_f$ wherein $R_f$ is a perfluorinated hydrocarbon radical, to a temperature of 250 to 600° C., and preferably to a temperature of 350 to 450° C., in the absence of a polymerization initiator. The perfluorinated olefins employed in the present invention, when heated to the temperatures stated hereinabove, react with each other through the opening of the double bond to form saturated compounds containing a perfluorinated four carbon atom ring. The reaction of the present invention is illustrated by the following equation in which $n$ is the number of carbon atoms in the perfluoroalkyl radical attached to the fluorovinyl bond. The equation shows the two position isomers formed.

$2CF_2=CF—C_nF_{2n+1} \longrightarrow$

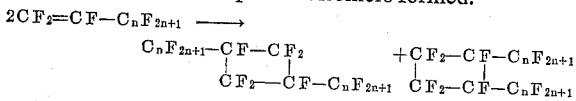

Analysis of the reaction products by gas chromatography has shown that the 1,2-isomer constitutes about 90 mol percent of the reaction product, and that the 1,3-isomer is obtained in about 5 mol percent concentration. Equal amounts of the cis- and trans-isomer of each position isomer are obtained. The proportion of the 1,3-position isomer is slightly increased at elevated temperatures.

The monoolefins employed in the present invention may be prepared by various methods, such as the pyrolysis of tetrafluoroethylene or polytetrafluoroethylene, or by the decarboxylation of the corresponding sodium salts of perfluorinated acids as disclosed in U.S. Patent 2,668,864 issued Feb. 9, 1954, to Hals et al. The formation of the dimers, in accordance with the present invention, occurs with perfluoroolefins having the general formula

where $R_f$ is a perfluoroalkyl radical having from 1 to 20, or an even higher number, of carbon atoms.

The process of the present invention is carried out at a temperature of 250 to 600° C., and preferably at a temperature of 350 to 450° C., in the absence of any other reactive compound. No catalysts, promoters or solvents are required, although it is possible to employ inert solvents such as perfluorinated saturated hydrocarbons. The pressure of the system may be varied over a wide range. Generally, the perfluorinated olefin is charged into a pressure reaction vessel in the liquid form and heated under autogenous pressure. It is preferred to employ vessels having an inert metal surface, such as silver or platinum, although it is also feasible to use stainless steel vessels. Glass vessels are generally not employed since perfluorinated olefins have a tendency to react with the glass at elevated temperatures.

The process of the present invention is further illustrated by the following examples.

Example I

Into a stainless steel reaction vessel was charged 100 g. of perfluoropropylene. The reaction vessel was heated to 400° C. for a period of 18 hours. The resulting product was a liquid having a boiling point at 44° C. and a melting point at approximately −40° C. The liquid did not decolorize a solution of bromine in carbon tetrachloride or potassium permanganate in acetone. The molecular weight corresponded to the formula $C_6F_{12}$. Analysis of the structure by elemental carbon and fluorine analysis, molecular weight, Raaman spectrum and nuclear magnetic resonance proved that the compound was the cyclic dimer of perfluoropropylene. Gas chromatography separation of the reaction product showed a distribution of isomers in the reaction mixture as follows:

| | Mol percent |
|---|---|
| 1,2-cis-perfluorodimethyl cyclobutane | 45 |
| 1,2-trans-perfluorodimethyl cyclobutane | 45 |
| 1,3-cis-perfluorodimethyl cyclobutane | 2.5 |
| 1,3-trans-perfluorodimethyl cyclobutane | 2.5 |

Example II

Into a platinum reaction tube of 140 ml. capacity was charged 100 g. of perfluoroheptene-1. The tube was sealed and placed into a stainless steel bomb. A hydrostatic pressure of 3000 atmospheres was applied and the bomb was heated to 400° C. for 20 hours, while maintaining an external pressure of 3000 atmospheres on the platinum reaction vessel. The bomb was cooled and the platinum tube opened. A colorless fraction of the product obtained through distillation at a temperature of 102 to 106° C. at 32 mm. pressure corresponded to the formula $C_{14}F_{28}$ and was a mixture of 1,2-cis-perfluorodipentyl cyclobutane, 1,2-trans-perfluorodipentyl cyclobutane, 1,3-cis-perfluorodipentyl cyclobutane and 1,3-trans-perfluorodipentyl cyclobutane in essentially the same proportions as found for the perfluorodimethyl cyclobutane isomers in Example I.

Example III

Example II was repeated employing perfluoropentene-1. The liquid product obtained was found to have a boiling point of 120 to 124° C., and corresponded to the formula $C_{10}F_{20}$, and was a mixture of the position (1,2- and 1,3-) and their stereo (cis- and trans-) isomers of perfluorodipropyl cyclobutane in substantially the same proportions as found for the $C_6F_{12}$ dimer in Example I.

The products obtained by the process of the present invention are extremely inert and stable liquids and solids, which are highly useful as solvents, corrosion- and heat-resistant lubricants, and dielectric media.

It was surprisingly discovered that the dimers of the present invention are subject to an equilibrium which allows their dissociation at elevated temperatures. Thus, it was discovered that heating a sample of perfluorodimethyl cylcobutane at 400° C. under autogenous pressure gave rise to 5 to 10% of perfluoropropylene. The equilibrium is shifted towards dissociation as the temperature increases. Thus, although dimer is formed at temperatures of 500 to 600° C., the dimer is obtained in low yields compared to the yields obtained at 400° C. If, however, the perfluorocyclobutane dimer is subjected to such temperatures, a substantial amount of the dimer reverts to the perfluoroolefin. This property of the cyclic dimers of the present invention is extremely useful, parularly with respect to gaseous perfluoroolefins. These perfluoroolefins, when employed as monomers in the polymerization to fluorocarbon resins, are extremely sensitive to impurities which cause the formation of low molecular weight resins or even inhibit their polymerization entirely. By means of the equilibrium, the gaseous monomers may be more readily stored, transported and purified in the form of the liquid inert dimer and then decomposed, when required to the reactive monomeric form in an extremely pure state. Furthermore, since the dimers of the present invention are outstanding polymerization media, the equilibrium of the cyclic dimers allows the simultaneous formation of pure monomer and polymerization medium.

We claim:
1. A perfluorinated dialkyl cyclobutane in which the perfluoroalkyl groups are on different carbon atoms and wherein the alkyl group has from one to five carbon atoms.
2. A perfluorinated dialkyl cyclobutane as set forth in claim 1 wherein the perfluoroalkyl group is a perfluoropropyl group, said compound having a boiling point of 120 to 124° C. at atmospheric pressure.
3. A perfluorinated dialkyl cyclobutane as set forth in claim 1 wherein the perfluoroalkyl group is a perfluoropentyl group, said compound having a boiling point of 102 to 106° C. at a pressure of 32 mm. mercury.
4. Compounds having the structure

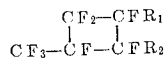

where one of $R_1$ and $R_2$ is fluorine and the other is a $-CF_3$ group.

5. Perfluoro-(1,2-dimethylcyclobutane).
6. Perfluoro-(1,3-dimethylcyclobutane).

References Cited by the Examiner
UNITED STATES PATENTS

| | | | |
|---|---|---|---|
| 2,456,027 | 12/1948 | Simons | 260—648 |
| 2,462,345 | 2/1949 | Barrick | 260—648 |
| 2,848,504 | 8/1958 | Dixon | 260—648 |

LEON ZITVER, *Primary Examiner.*

A. M. BOETTCHER, A. D. SULLIVAN, *Examiners.*

M. H. SEARS, J. W. WILLIAMS, R. V. ROCKEY, N. J. KING, JR., *Assistant Examiners.*